United States Patent [19]

Whateley

[11] 3,859,870

[45] Jan. 14, 1975

[54] VARIABLE-SPEED AND REVERSE GEARBOXES

[75] Inventor: Eric Albert Whateley, Huddersfield, England

[73] Assignee: David Brown, Gear Industries Limited, Meltham, Huddersfield, England

[22] Filed: Sept. 18, 1972

[21] Appl. No.: 290,155

[30] Foreign Application Priority Data
Oct. 16, 1971 Great Britain............. 48233/71
May 4, 1972 Great Britain............. 20732/72

[52] U.S. Cl.............. 74/745, 74/339, 74/360, 74/731
[51] Int. Cl.............................. F16h 3/08
[58] Field of Search............. 74/745, 731, 360, 339

[56] References Cited
UNITED STATES PATENTS

| | | | |
|---|---|---|---|
| 1,991,694 | 2/1935 | Peterson | 74/745 |
| 2,106,870 | 2/1938 | Floss | 74/745 |
| 2,305,927 | 12/1942 | Kummich | 74/745 |
| 2,689,031 | 8/1954 | Hersler | 74/745 |
| 2,794,348 | 5/1957 | Perkins | 74/745 |
| 2,805,743 | 9/1957 | Keese | 74/745 |
| 3,498,155 | 3/1970 | Ivancheck | 74/745 |

*Primary Examiner*—Samuel Scott
*Assistant Examiner*—John Reep
*Attorney, Agent, or Firm*—Norris & Bateman

[57] ABSTRACT

A variable-speed and reverse gearbox of the dual-range type comprises variable-speed gearing having an input shaft, a layshaft, and a driven shaft constituting an intermediate shaft of the gearbox; dual-range gearing having its torque input via said intermediate shaft and having also a countershaft and an output shaft; said input, intermediate and output shafts being coaxial; and reverse gearing utilising said layshaft and said countershaft without the need for a separate reverse shaft although this use of the countershaft does not prevent the dual-range gearing from operating to double the number of available reverse speeds.

14 Claims, 2 Drawing Figures

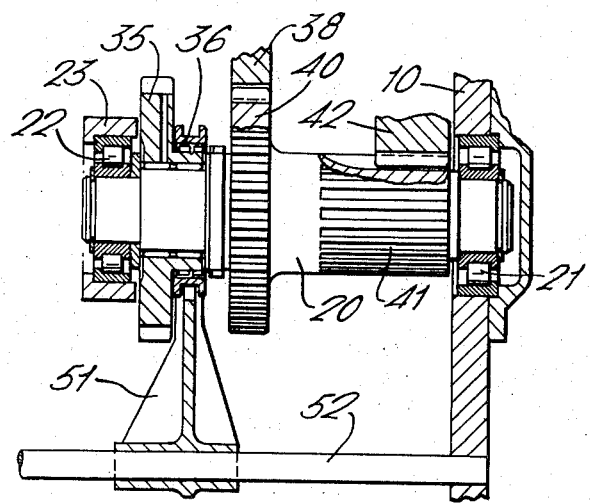

VARIABLE-SPEED AND REVERSE GEARBOXES

BACKGROUND OF THE INVENTION

The invention relates to variable-speed and reverse gearboxes of the dual-range type incorporating auxiliary two-speed gearing in series with the main gearing, and has for its object to provide a gearbox of the type referred to with a minimal number of shafts.

SUMMARY OF INVENTION

According to the invention, a variable-speed and reverse gearbox comprises an input shaft, an intermediate shaft co-axial with the input shaft, an output shaft co-axial with the intermediate shaft, a layshaft parallel to the aforementioned shafts, a countershaft parallel to the layshaft, a gear fixed on the input shaft meshing constantly with a gear fixed on the layshaft, at least one gear rotatably mounted on the intermediate shaft meshing constantly with a gear fixed on the layshaft, clutch means for drivably connecting the input shaft directly to the intermediate shaft and, alternatively, for drivably connecting the gear rotatably mounted on the intermediate shaft to said shaft, a reverse gear fixed on the layshaft meshing constantly with another reverse gear rotatably mounted on the countershaft, clutch means for drivably connecting the last-mentioned gear to the coutershaft, a gear fixed on the intermediate shaft meshing constantly with a gear fixed on the countershaft, a gear rotatably mounted on the output shaft meshing constantly with another gear fixed on the countershaft, clutch means for drivably connecting the intermediate shaft directly to the output shaft and, alternatively, for drivably connecting the gear rotatably mounted on the output shaft to said shaft, and control means for selecting any one of the available power paths through the gearbox.

Throughout this specification, where a gear is said to be "fixed" on a shaft, it is intended that this expression shall cover cases where the gear is integral with the shaft and where it is rigidly secured on the shaft.

BRIEF DESCRIPTION OF DRAWINGS

A preferred embodiment of the invention will now be described, by way of example only, with reference to the accompanying drawings of which:

FIG. 2 is a sectional view of a shaft not visible in FIG. 1, in two mutually inclined planes which intersect at its axis.

DESCRIPTION OF PREFERRED EMBODIMENT

Figure 1:
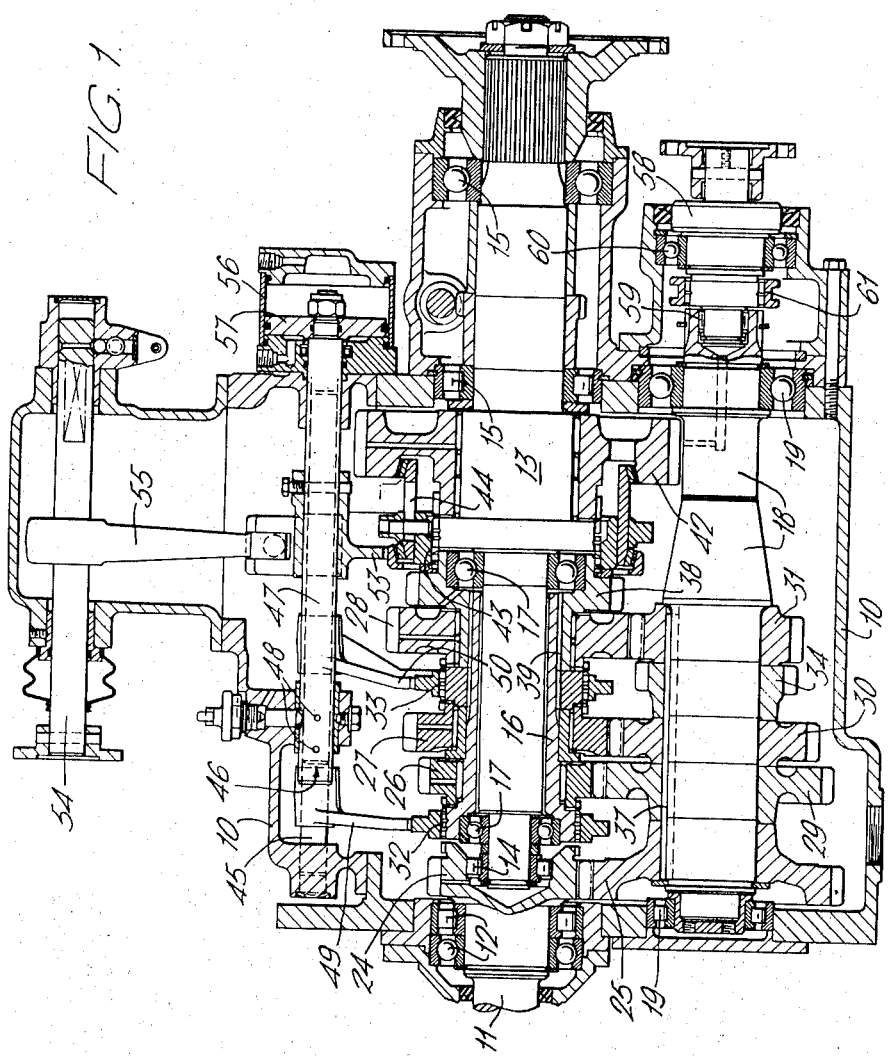
FIG. 1 is a sectional side elevation of a variable-speed and reverse gearbox of the type referred to, for a heavy commercial road vehicle.

Referring now to the drawings, a gearbox comprises a casing 10, an input shaft 11 rotatably mounted in bearings 12 in the casing 10, an output shaft 13 co-axial with the input shaft 11 and rotatably mounted at one end in a bearing 14 housed in the input shaft and near the other end in bearings 15 in the casing 10, an intermediate shaft in the form of a sleeve 16 co-axially surrounding the output shaft 13 near said one of its ends and rotatably mounted on bearings 17 on the output shaft, a layshaft 18 parallel to the three aforementioned shafts 11, 13 and 16 and rotatably mounted in bearings 19 in the casing 10, and a countershaft 20 parallel to the layshaft 18 and rotatably mounted at one end in a bearing 21 in the casing 10 and at the other end in a bearing 22 in a stub wall or lug 23 integral with and projecting inwardly from the casing. A gear 24 integral with the input shaft 11 meshes constantly with a gear 25 fixed on the layshaft 18, and three gears 26, 27 and 28 whose pitch circle diameters differ from one another in well known manner are rotatably mounted on needle bearings on the intermediate shaft 16 and mesh constantly with three gears 29, 30 and 31 also fixed on the layshaft. A conventional dog clutch 32 incorporating a known clutch lock to prevent jumping out of gear is disposed near that end of the intermediate shaft 16 adjacent the input shaft 11 and is arranged either to connect drivably the input shaft directly to the intermediate shaft, or to connect drivably the smallest one 26 of the gears rotatably mounted on the intermediate shaft to said intermediate shaft, or to occupy a neutral position as shown in FIG. 1. Another conventional dog clutch 33 also incorporating a clutch lock is disposed between the two larger ones 27 and 28 of the gears rotatably mounted on the intermediate shaft 16 and is arranged to connect drivably either of said two gears to said intermediate shaft or to occupy a neutral position as shown in FIG. 1. A reverse gear 34 fixed on the layshaft 18 meshes constantly with a reverse gear 35 rotatably mounted on needle bearings on the countershaft 20, and a further conventional dog clutch 36 which also incorporates a clutch lock is disposed on a boss integral with the gear 35 and is arranged either to connect drivably said gear 35 to the countershaft or to occupy a neutral position as shown in FIG. 2. All of the gears 25, 29, 30, 31 and 34 carried by the layshaft 18 are rigidly secured on said shaft by means of a key 37. A gear 38 rigidly secured on the intermediate shaft 16 by means of splines 39 meshes constantly with a gear 40 integral with the countershaft 20, and a gear 41 also integral with the countershaft meshes constantly with a gear 42 rotatably mounted on needle bearings on the output shaft 13. A conventional dog clutch 43 incorporating a clutch lock and a known synchromesh device 44 is disposed on the output shaft 13 adjacent that end of the intermediate shaft 16 remote from the input shaft 11 and is arranged either to connect drivably the intermediate shaft directly to the output shaft as shown in FIG. 1, or to connect drivably the gear 42 to the output shaft. Control means for selecting any one of the available power paths through the gearbox include three selector rods 45, 46 and 47 and another selector rod (not shown), all four selector rods being parallel and adjacent to one another and having conventional interlock means, parts of which are shown at 48. The rods 45 and 46 carry respective selector forks 49 and 50 operatively engaging the respective dog clutches 32 and 33, and said other selector rod carries an arm (not shown) which actuates a selector fork 51 slidable on a fixed bar 52 parallel to but spaced from the selector rods and operatively engaging the dog clutch 36. The selector rod 47 carries a selector fork 53 operatively engaging the dog clutch 43. The selector rods 45 and 46 and said other selector rod (not shown) are actuated manually in conventional manner by way of a rotationally and axially movable shaft 54 on which there is rigidly secured an arm 55, and the selector rod 47 is actuated in known manner by compressed air supplied selectively to one end or the other of a double-acting pneumatic cylinder 56 containing a piston 57 secured to one end of the rod 47. A power take-off shaft 58 co-axial with the layshaft 18 is rotatably mounted at one end in a bearing 59 housed in the layshaft and between its ends in a bearing 60 in the casing 10. A conventional dog clutch 61 incorporating a clutch lock is disposed near that end of the power take-off shaft 58 adjacent the layshaft 18 and is arranged either to connect drivably the power take-off shaft to the layshaft or to occupy a neutral position as shown in FIG. 1. The dog clutch 61 is operated manually by linkage means (not shown).

In operation, eight forward and two reverse speeds are available. To obtain any one of the forward speeds, either the dog clutch 32 or the dog clutch 33 is moved into one of its operative positions to cause the intermediate shaft 16 to rotate at any one of four mutually different speeds relative to, and in the same direction as, the input shaft 11, and the dog clutch 43 incorporating the synchromesh device 44 occupies or is moved into one of its alternative positions to cause the output shaft 13 to rotate at either the same speed as or a different speed to the intermediate shaft 16 in the same direction as said shaft. To obtain either of the reverse speeds, the dog clutch 36 is moved into its operative position to cause the countershaft 20 to rotate in the same direction as the input shaft 11 and thus to cause the intermediate shaft 16 to rotate in the opposite direction to the input shaft, and the dog clutch 43 incorporating the synchromesh device 44 occupies or is moved into one of its alternative positions to cause the output shaft 13 to rotate in the opposite direction to the input shaft at either the same speed as, or a different speed to, the intermediate shaft. Thus the countershaft 20, the two gears 40 and 41 integral with said shaft, the gear 38 rigidly secured on the intermediate shaft 16, the gear 42 rotatably mounted on the output shaft 13, and the dog clutch 43 incorporating the synchromesh device 44 constitute conventional auxiliary dual-range gearing in series with the main gearing interconnecting the input shaft 11, the layshaft 18 and the intermediate shaft 16. However, the reverse gearing makes use of the countershaft 20 of the dual-range gearing thereby rendering a separate reverse shaft unnecessary although this economy does not prevent the dual-range gearing from operating to double the number of available reverse speeds. The gearbox has the further advantage that its casing 10 does not require a partition wall to support its shafts, other than the stub wall or lug 23 in which said other end of the countershaft 20 is mounted, thus saving weight, complexity and cost.

To drive the power take-off shaft 58, the dog clutch 61 is moved into its operative position to connect said shaft to the layshaft 18. As the latter is driven constantly by the input shaft 11, the power take-off shaft 58 then rotates whenever the input shaft 11 is rotating.

The pitch circle diameters of the dual-range gears 38, 40, 41 and 42 are such that the output shaft 13 rotates at a considerably slower speed than the intermediate shaft 16 when the gear 42 is drivably connected to the output shaft by the dog clutch 43. In a modification, the pitch circle diameters of at least one pair of the dual-range gears are changed so as to provide an overdrive, that is to say so that the output shaft 13 rotates at a faster speed than the intermediate shaft 16 when the gear rotatably mounted on the output shaft is drivably connected thereto by the dog clutch 43.

In another modification, instead of the output shaft being rotatably mounted at one end in a bearing housed in the input shaft and the intermediate shaft constituting a sleeve co-axially surrounding a portion of the output shaft, the output shaft is co-axial with but spaced from the input shaft and rotatably mounted in bearings in the casing and the intermediate shaft is rotatably mounted in bearings in the adjacent ends of the input and output shafts.

What I claim is:

1. A variable-speed and reverse gearbox comprising an input shaft, an intermediate shaft co-axial with the input shaft, an output shaft co-axial with the intermediate shaft, a layshaft parallel to the aforementioned shafts, a counter-shaft parallel to the layshaft, a gear fixed on the input shaft meshing constantly with a gear fixed on the layshaft, at least one gear rotatably mounted on the intermediate shaft meshing constantly with a gear fixed on the layshaft, clutch means for drivably connecting the input shaft directly to the intermediate shaft and, alternatively, for drivably connecting the gear rotatably mounted on the intermediate shaft to said intermediate shaft, a reverse gear fixed on the layshaft meshing constantly with another reverse gear rotatably mounted on the countershaft, clutch means for drivably connecting the last-mentioned gear to the countershaft, a gear fixed on the intermediate shaft meshing constantly with a gear fixed on the countershaft, a gear rotatably mounted on the output shaft meshing constantly with another gear fixed on the countershaft, clutch means for drivably connecting the intermediate shaft directly to the output shaft and, alternatively, for drivably connecting the gear rotatably mounted on the output shaft to said output shaft, and control means for said clutch means operable for selecting any one of the available power paths through the gearbox.

2. A variable-speed and reverse gearbox according to claim 1, wherein the output shaft is supported at one end by the input shaft, and the intermediate shaft constitutes a sleeve surrounding the output shaft.

3. A variable-speed and reverse gearbox according to claim 1, wherein the output shaft is co-axial with but spaced from the input shaft and the intermediate shaft is supported by the adjacent ends of the input and output shafts.

4. A variable-speed and reverse gearbox according to claim 1, wherein the clutch means for drivably connecting the intermediate shaft directly to the output shaft and, alternatively, for drivably connecting the gear rotatably mounted on the output shaft to said output shaft include a synchromesh device.

5. A variable-speed and reverse gearbox according to claim 1, wherein the pitch circle diameters of the two gears fixed on the countershaft and of the two gears meshing constantly therewith are such that these four gears provide a speed reduction.

6. A variable-speed and reverse gearbox according to claim 1, wherein the pitch circle diameters of the two gears fixed on the countershaft and of the two gears meshing constantly therewith are such that these four gears provide an overdrive.

7. A variable-speed and reverse gearbox according to claim 1, wherein a power take-off shaft is co-axial with the layshaft and clutch means is provided whereby said power take-off shaft can be drivably connected to the layshaft.

8. A variable-speed and reverse gearbox including an input shaft, an output shaft co-axial with and journalled at one end in the input shaft, an intermediate shaft in the form of a sleeve co-axially surrounding the output shaft near said one end of the latter, a layshaft parallel to the aforementioned shafts, a countershaft parallel to the layshaft, main gearing comprising variable-speed gearing drivably interconnecting the input shaft, the layshaft and the intermediate shaft and reverse gearing drivably interconnecting the layshaft and the countershaft, and dual-range gearing in series with the main gearing for doubling the number of speed ratios obtainable therefrom and drivably interconnecting the intermediate shaft, the countershaft and the output shaft.

9. A variable-speed and reverse gearbox according to claim 8, having two dual-range gears fixed on the countershaft, one of which meshes constantly with a gear fixed on the intermediate shaft and the other of which meshes constantly with a gear rotatably mounted on the output shaft, and clutch means for drivably connecting the intermediate shaft directly to the output shaft and, alternatively, for drivably connecting to the output shaft the gear rotatably mounted thereon.

10. A variable-speed and reverse gearbox according to claim 9, wherein the clutch means include a synchromesh device.

11. A variable-speed and reverse gearbox according to claim 9, wherein the pitch circle diameters of the two dual-range gears fixed on the countershaft and of the two gears meshing constantly therewith are such that these four gears provide a speed reduction.

12. A variable-speed and reverse gearbox according to claim 9, wherein the pitch circle diameters of the two dual-range gears fixed on the countershaft and of the two gears meshing constantly therewith are such that these four gears provide an overdrive.

13. A variable-speed and reverse gearbox according to claim 8, having a reverse gear rotatably mounted on the countershaft and meshing constantly with a gear fixed on the layshaft, and clutch means for drivably connecting to the countershaft the reverse gear rotatably mounted thereon.

14. A variable-speed and reverse gearbox according to claim 8, wherein a power take-off shaft co-axial with the layshaft is drivably connectible to the layshaft by clutch means.

* * * * *